United States Patent [19]

Russell

[11] 4,084,706
[45] Apr. 18, 1978

[54] HOISTING DOLLY

[75] Inventor: Arvin E. Russell, Indianapolis, Ind.

[73] Assignees: Clifford E. Badgley; C. Brent Badgley, both of Indianapolis, Ind.

[21] Appl. No.: 676,395

[22] Filed: Apr. 12, 1976

[51] Int. Cl.² ............................................. B65G 65/38
[52] U.S. Cl. ................... 214/1 D; 214/314; 214/620; 214/652; 214/701 R; 294/111
[58] Field of Search ............... 294/111; 214/1 D, 652, 214/620, DIG. 3, DIG. 4, 318, 313, 314, 653, 700, 701 R, 701 P

[56] References Cited

U.S. PATENT DOCUMENTS

| 2,632,574 | 3/1953 | Goertz | 294/111 X |
| 2,645,372 | 7/1953 | Broersma | 214/652 |
| 2,683,546 | 7/1954 | Sherriff | 214/652 |
| 2,755,949 | 7/1956 | Schenkelberger | 214/652 |
| 3,623,620 | 11/1971 | Vermette | 214/313 |

Primary Examiner—Drayton E. Hoffman
Assistant Examiner—George F. Abraham
Attorney, Agent, or Firm—Gust, Irish, Jeffers & Rickert

[57] ABSTRACT

A dolly for lifting and transporting cumbersome objects such as barrels is disclosed having a wheel supported base and a pair of horizontally disposed arms supported on that base in cantilever fashion which arms are simultaneously movable in a vertical direction. An open ended object clamp for gripping the object to be transported is pivotably connected to the arms near the free ends thereof so that the object clamp may be rotated about a horizontal axis and the open end thereof directed downwardly to engage an object from above or that open end directed horizontally to engage an object from the side despite the fact that that object may be against a wall or other obstacle.

4 Claims, 14 Drawing Figures

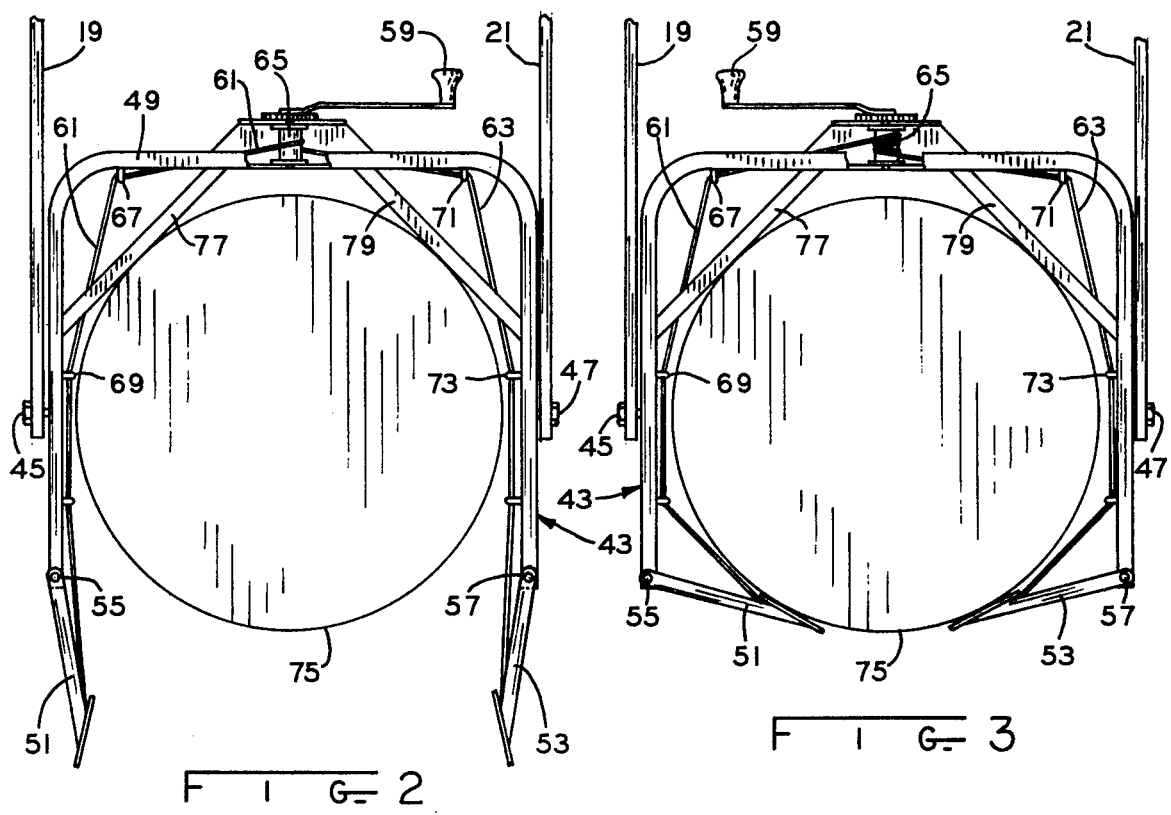
FIG. 2
FIG. 3
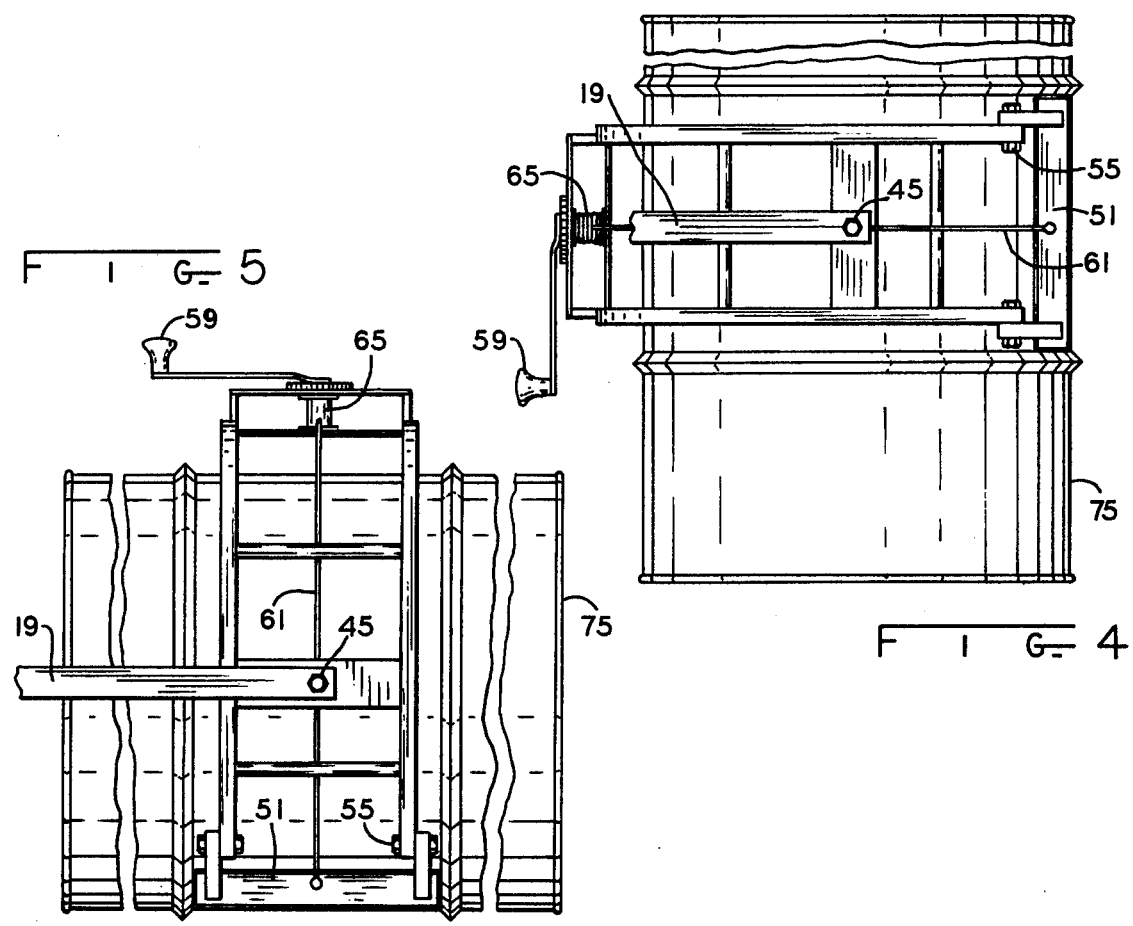
FIG. 5
FIG. 4

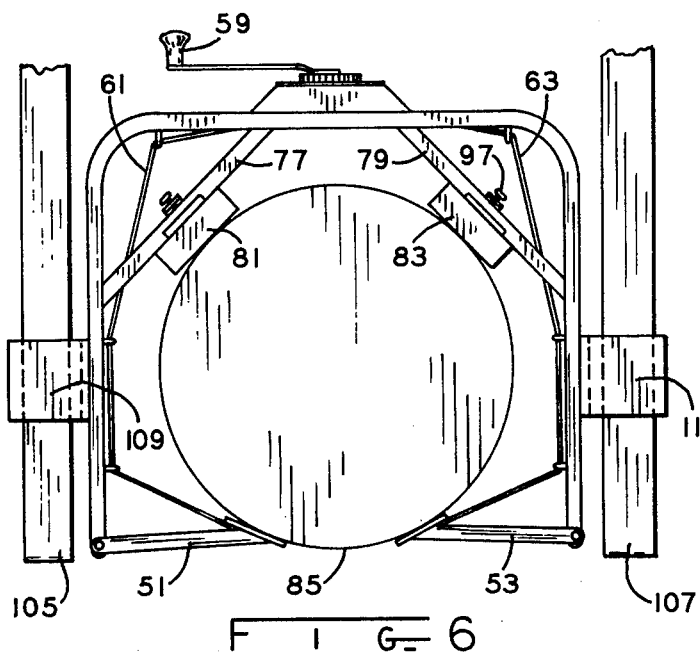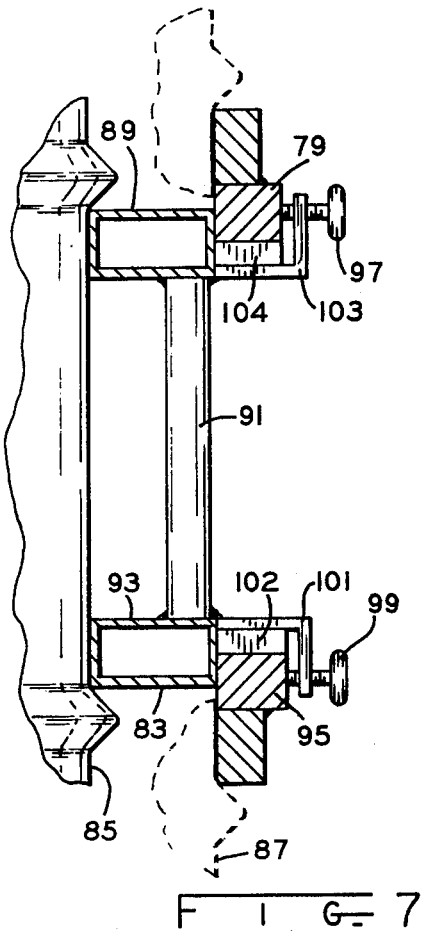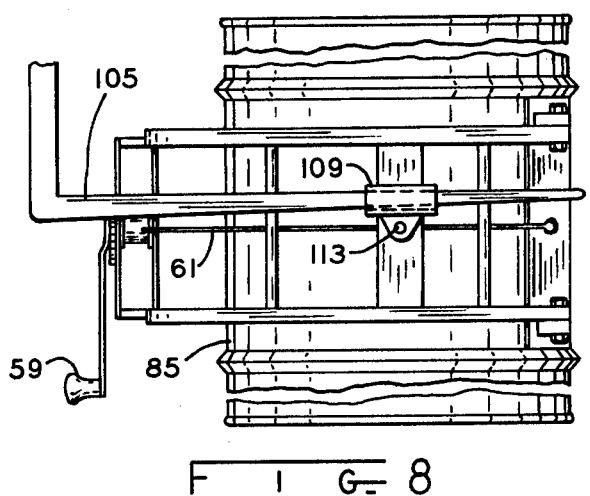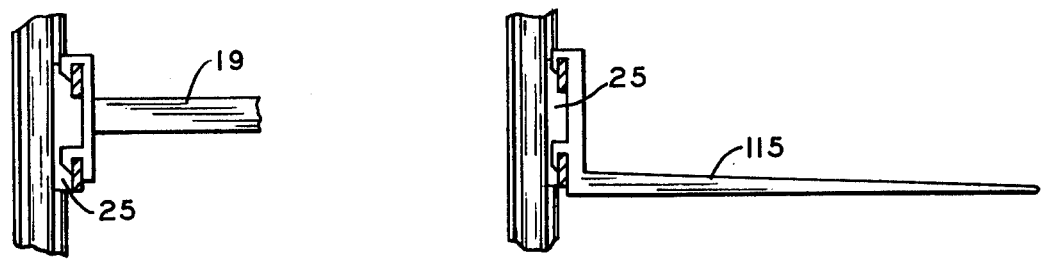

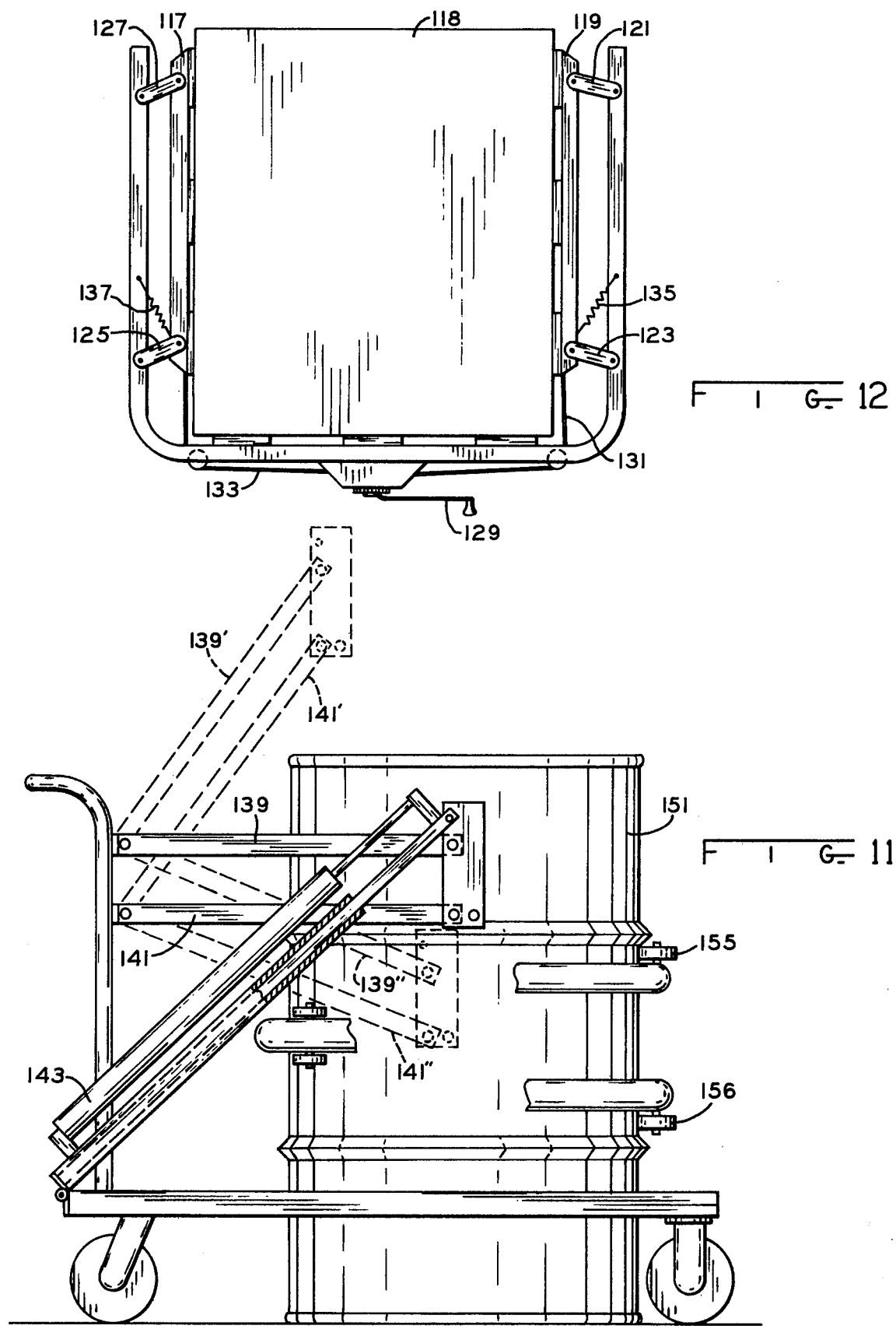

HOISTING DOLLY

BACKGROUND OF THE INVENTION

The present invention relates generally to carriers for large or heavy objects and more particularly to such carriers employing an open ended object clamp for gripping objects to be transported.

The moving of large objects has in the past been accomplished by electrically powered conventional fork lift trucks which usually necessitates that the object be placed on a pallet compatible with the fork lift truck tangs. There are also numerous hand propelled carts of a general purpose design such as those typically employed by furniture moving companies for transporting refrigerators and the like.

Numerous special purpose carriers for transporting cumbersome objects such as drums or barrels containing liquid chemicals and the like have also been designed and suffer from one or more of the following defects. Such carriers typically cannot pick up a drum from the floor when that drum is laying on its side and further cannot engage such a drum when in the vertical position and against a wall or other obstacle. With such carriers, the drum typically cannot be revolved about its own axis, for example, to properly orient a spout for pouring purposes. Frequently the drum must be hand raised and placed on a pedestal even when in its upright position and away from a wall or other obstacle. Frequently such carriers do not allow the drum to be rotated about a horizontal axis and especially do not allow for a full 360° or more rotation of the drum about a horizontal axis. Typically the structure of such carriers is not adaptable to varying size drums.

SUMMARY OF THE INVENTION

Among the several objects of the present invention may be noted the provision of a carrier for lifting and moving cumbersome objects which obviates one or more of the aforementioned prior art defects; the provision of a carrier specifically suited to drums or barrels yet readily adaptable to other objects; a carrier which may be converted for normal fork lift tasks or, in the alternative, a carrier clamp which may be adapted to existing fork lift trucks; the provision of an object clamp for directly engaging and picking up hitherto inaccessible objects; and the provision of a carrier which may be hand propelled and independent of any power source yet possessing mechanical advantage features such as to be easily operated.

In general, and in one form of the invention, objects are lifted and moved by a base rollably supported on wheels having a pair of generally horizontal extending arms supported on that base in cantilever fashion which arms are simultaneously movable in a vertical direction and pivotably connect near their free ends to an open ended object clamp for selectively gripping an object to be transported which clamp, when gripping the object, extends less than completely around the object. When the object clamp is for gripping a drum or barrel it may include a plurality of rollers disposed about the clamp interior for engaging the cylindrical surface of the drum with each roller being rotatable about an axis generally parallel to the drum axis thereby allowing rotation of the drum about its axis while the drum is gripped by the clamp.

BRIEF DESCRIPTION OF THE DRAWING

FIG. 2 is a top view of a portion of the cart of FIG. 1 illustrating the object clamp in its open position;

FIG. 3 is a top view similar to FIG. 2 but illustrating the object clamp in its closed position gripping a drum or similar cylindrical object;

FIG. 4 is a side view of the object clamp and drum corresponding to FIG. 3;

FIG. 5 is a side view similar to FIG. 4 where, however, the drum and clamp have been rotated about a horizontal axis such that the drum cylindrical axis is also horizontal;

FIG. 6 illustrates a modified object clamp which is selectively adaptable to gripping larger or smaller cylindrical objects;

FIG. 7 is a side view partially in section illustrating one adapter of FIG. 6;

FIG. 8 illustrates in side view an object clamp compatible with a conventional fork lift truck;

FIGS. 9 and 10 illustrate the manner in which a cart similar to that illustrated in FIG. 1 may optionally be converted from a drum carrying task to accomplish standard fork lift tasks;

FIG. 11 is a side view of a modified hand propelled cart or dolly according to the present invention;

FIG. 12 is a top view of a modified object clamp for gripping rectangular objects;

The following detailed disclosure is illustrative of the invention in a preferred form with exemplary modifications and is not to be construed as limiting in any manner.

DESCRIPTION OF THE PREFERRED EMBODIMENT

Figure 1:
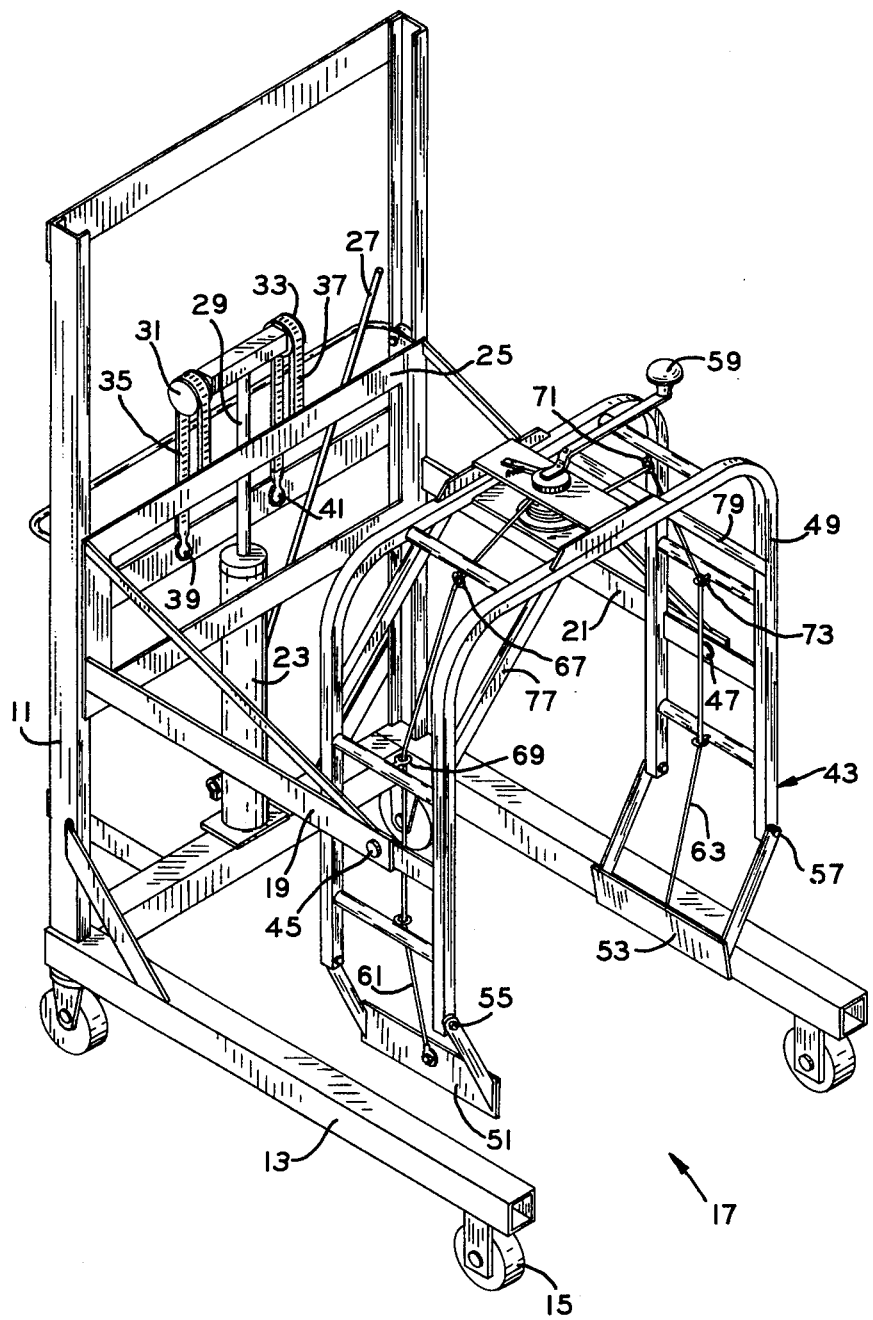
FIG. 1 is a perspective view of a hand propelled cart or dolly according to the invention in one form.

Considering first the hand propelled cart illustrated perspectively in FIG. 1, a base portion 11 has a rectangular bottom frame 13 and is rollably supported on wheels or casters 15 for movement in generally horizontal directions. The rectangular bottom frame 13 is open at 17 to allow the cart or carrier to straddle an object to be lifted. The base 11 supports in cantilever fashion a pair of generally horizontally extending arms 19 and 21 which arms are simultaneously movable in a vertical direction relative to the base 11 by the hydraulic cylinder 23 acting on the common portion 25 of those arms. Thus the common portion 25 may slide in tracks in the vertical portion of the base 11. The cylinder 23 may be a conventional hydraulic jack arrangement and actuation of the arm or lever 27 functions to extend the piston rod 29 raising the pair of chain engaging sprockets 31 and 33 with one end of respective chains 35 and 37 being affixed to the base as at 39 and 41 while the other end of each of the chains is attached to the common portion 25 of the two arms.

The cantilevered vertically movable arms pivotably engage an object clamp 43 near their respective free ends as at pivots 45 and 47 so that the object clamp 43 may be rotated about a generally horizontal axis. The object clamp is open ended and in the position illustrated is directed downwardly to engage an object from above such as a drum lying on its side on the floor. If the object clamp 43 were to be rotated 90° about the horizontal axis defined by the pivots 45 and 47 and into the position illustrated in FIGS. 2, 3 and 4, the open end of the object clamp would then be directed horizontally for engaging an object from the side such as a drum or barrel which is standing on end and perhaps against a wall or other obstacle.

Turning now to FIG. 2 the object clamp 43 is seen to include a rigid U-shaped portion 49 and a pair of jaws 51 and 53 each pivotally attached at 55 and 57 respectively to sides of the U-shaped portion 49. The jaws are moved toward one another to grip an object by actuation of a hand crank 59 which draws a pair of cables 61 and 63 about a drum 65. The cables pass through a series of guides 67, 69, 71 and 73 and as the cables are pulled the respective jaws 51 and 53 move toward one another to securely grip an exemplary drum 75 between the two jaws and the rigid U-shaped portion, for example, against the brackets 77 and 79. Once the drum is gripped as illustrated in FIG. 3 and FIG. 4 that drum may be rotated about the horizontal axis defined by the pivot points 45 and 47, for example, into the position illustrated in FIG. 5.

The cylindrical object illustrated in FIGS. 2, 3, 4, and 5 might, for example, by a standard 55 gallon barrel and the same open ended object clamp may be used to grip a smaller still standard 35 gallon barrel as illustrated in FIG. 6. In FIG. 6 a pair of adapters 81 and 83 are removably affixed within the U-shaped portion to the brackets 77 and 79 to effectively diminish the object gripping distance between the bottom of the U and the jaws 51 and 53 to grip the smaller barrel. The details of a single adapter and the respective larger and smaller drums may be seen from the partial cross section view of FIG. 7.

In FIG. 7 the adapter 83 engages the side wall 85 of the smaller drum whereas the bracket 79 engages the side wall of the larger drum 87. The adapter may simply comprise a rectangular tube 89 interconnected by pipe 91 to a similar rectangular tube 93 and attached to the bracket 79 and a similar bracket 95 directly therebelow by a pair of thumb screws 97 and 99 in conjunction with two L-shaped or angle irons 101 and 103 and optional spacers 102 and 104.

FIGS. 6, 7 and 8 illustrate another variation of the present invention in that the object clamp may be raised and lowered and supported for pivotable movement about a horizontal axis by disposing that object clamp on a pair of standard fork lift prongs 105 and 107. With this variation a pair of brackets 109 and 111 engage the two fork lift prongs and have a pair of pivot pins such as 113 for supporting the object clamp.

Not only may the object clamp be supported by the standard prongs of a fork lift truck as illustrated in FIGS. 6 and 8, the hand propelled cart of FIG. 1 may also be modified to function as a hand operated fork lift arrangement as illustrated in FIGS. 9 and 10. The arm 19 which is depicted as connecting to the movable portion 25 in FIG. 1 may be hooked to that portion in the manner depicted in FIG. 9 so that simply raising the arm 19 will remove it from the sliding framework 25. A fork lift tang or prong 115 may have a similar hook arrangement near its attaching end and be substituted for the arm 19 as illustrated in FIG. 10.

A number of further variations are within the scope of the present invention. FIG. 12 illustrates one manner in which a rectangular object 118 may be gripped by the object clamp. Jaws 117 and 119 are pivotally attached in a parallelogram type linkage by the arms 121, 123, 125 and 127 which are pivotable at one end to the fixed U-shaped portion of the clamp and at their respective other ends to the individual jaws. As before a crank 129 functions to tension a cable 131 and a cable 133 which cables pivot the jaws 117 and 119 into contact with the rectangular load against the tension of springs 135 and 137. The U-shaped portion of this clamp may be pivotably attached to the cantilever arms as with the clamp of FIG. 1 or another parallelogram linkage may be employed as in FIG. 11.

In FIG. 11 a pair of arms 139 and 141 support the open ended object clamp so that it may pivot about a horizontal axis as before; however, these arms 139 and 141 themselves pivot at either end in a parallelogram type configuration in response to expansion or contraction of the cylinder 143. This cylinder may be hydraulic or air actuated as desired and, as in the embodiment of FIG. 1, a winch arrangement may be substituted for the cylinder.

Figure 13:
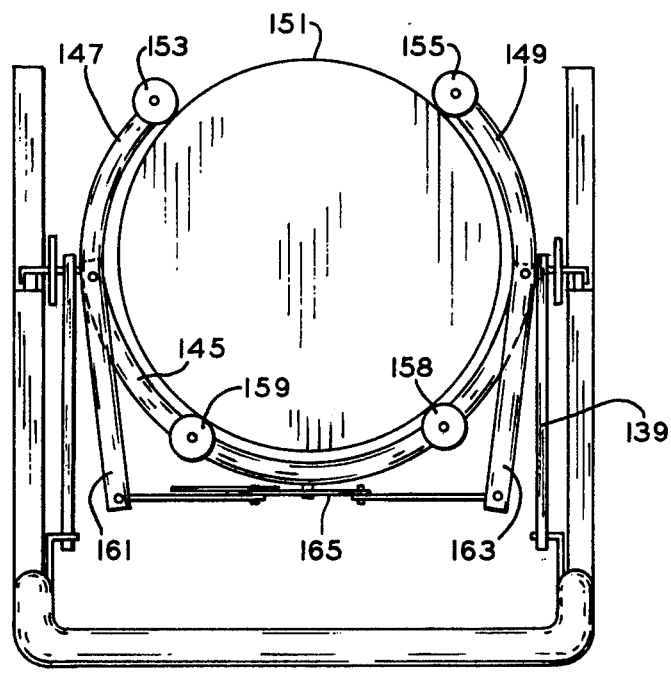
FIG. 13 illustrates a further variation on an object clamp employing object engaging rollers.
Figure 14:
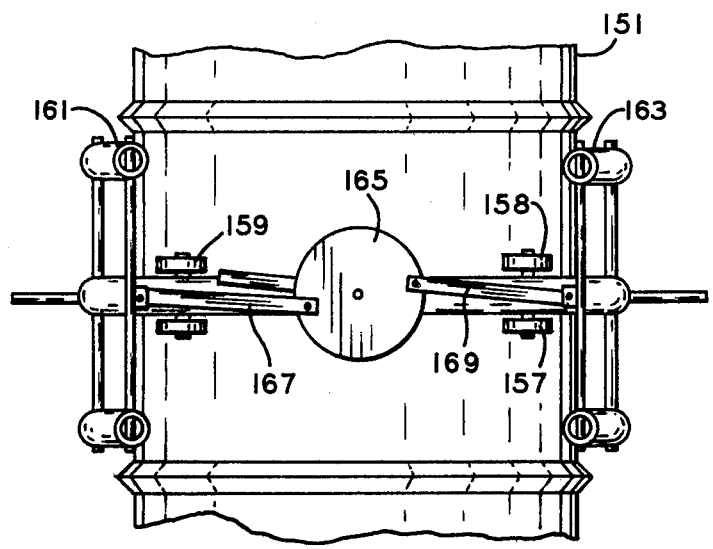
FIG. 14 is a side view of a portion of the structure of FIG. 13.

FIGS. 11, 13 and 14 illustrate a further variation on the open ended object clamp which as before has a rigid U-shaped portion 145 at the opposite ends of which are pivotally attached a pair of jaws 147 and 149. The jaws and U-shaped portion engage a drum 151 by a plurality of rollers 153, 155, 158 and 159. These rollers are disposed about the clamp interior and engage the cylindrical surface of the object 151 so that each roller has its axis generally parallel to the axis of the cylindrical object 151 thereby allowing rotation of the object about its cylindrical axis while the object is being gripped by the clamp. The barrel can be rotated in the clamping device and can also be rolled end over end. This will enable a person to mix the contents of the barrel. Jaws 147 and 149 are actuated by a pair of rigidly affixed arms 161 and 163 which in turn are forced away from one another as viewed in FIG. 13 by a crank arrangement 165. Thus in operating the embodiment illustrated in FIGS. 11, 13 and 14 the operator would approach drum 151 with jaws 147 and 149 spread apart so as to straddle the drum and with arms 139 and 141 extending from the cart in a generally horizontal direction as illustrated at 139″ and 141″. Crank 165 would then be rotated to move arms 167 and 169 outwardly and these arms in turn would force jaws 147 and 149 inwardly to grip the drum 151. The hydraulic cylinder 143 would then be actuated lifting the parallelogram linkage 139 and 141 to the position illustrated in FIG. 11 and, if desired, even higher to, for example, 139′ and 141′. Double rollers such as 155 and 156 may be employed for stability while some of the rollers such as 157 may comprise but a single roller or a pair of closely spaced rollers 157 and 158.

From the foregoing it is now apparent that a novel hand propelled carrier has been described meeting the objects and advantages outlined hereinbefore as well as others. Numerous modifications will suggest themselves to those of ordinary skill in the art and such modifications may be made without departing from the spirit or scope of the invention as set out in the claims which follow.

What is claimed is:

1. A carrier for lifting and moving cumbersome objects comprising:
   a hand propellable cart including a base consisting of a generally horizontally disposed rectangular frame open at one end to allow the carrier to straddle an object to be lifted and rollably supported on wheels for movement in generally horizontal directions;

a pair of generally horizontally extending arms supported on the base by means providing movement relative thereto in a generally vertical direction;

an open ended object clamp for selectively gripping objects to be transported, the object clamp when gripping the object extending less than completely around the object and including a rigid U-shaped portion, a pair of jaws each pivotably attached to a respective side of the U-shaped portion, and means for moving the jaws toward one another to grip the object said means including cable for each jaw which is attached to the jaw near the free end thereof and hand actuable crank means disposed on the rigid U-shaped portion for tensioning each of the cables to move the free ends of the jaws toward each other, the jaws pivoting about respective free ends of the U-shaped portion whereby an object may be gripped between the jaws and the rigid U-shaped portion;

pivot means connecting the object clamp to the arms near the free ends thereof to allow the object clamp to be rotated freely about a generally horizontal axis whereby the open end of the object clamp may be directed downwardly to engage an object from above and directed horizontally to engage an object from the side.

2. The carrier of claim 1 wherein the means providing relative movement includes hydraulically actuable means interconnecting the base and arms for moving the arms.

3. The carrier of claim 1 further comprising adaptor means removably affixable to the U-shaped portion within the U to effectively diminish the object gripping distance between the bottom of the U and the jaws to adapt the clamp to grip smaller objects.

4. The carrier of claim 1 wherein the arms are removably supported on the base for removal and substitution of a pair of fork lift prongs to allow the carrier to be used as a conventional fork lift truck.

* * * * *